March 1, 1960 — C. LIGON — 2,926,658
SHUTTER TYPE FURNACE OBSERVATION PORT
Filed July 19, 1957 — 3 Sheets-Sheet 1

Cleon Ligon
INVENTOR.

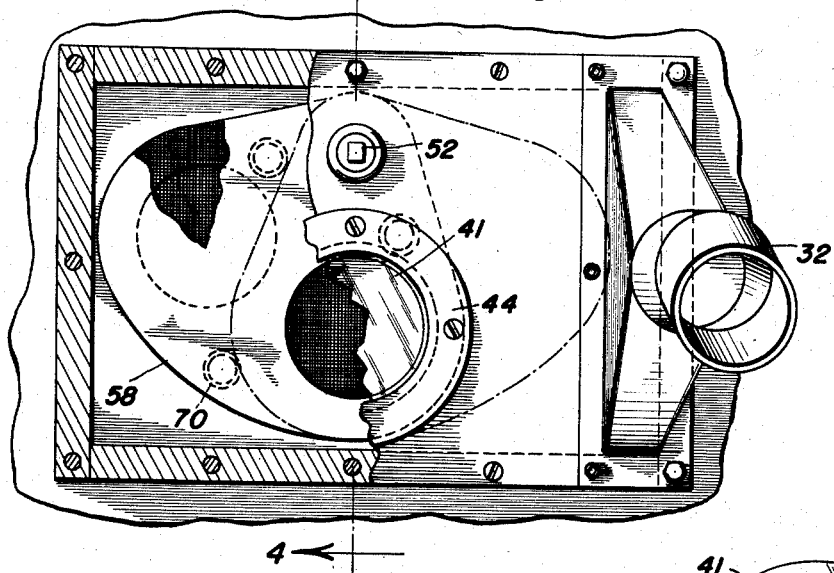
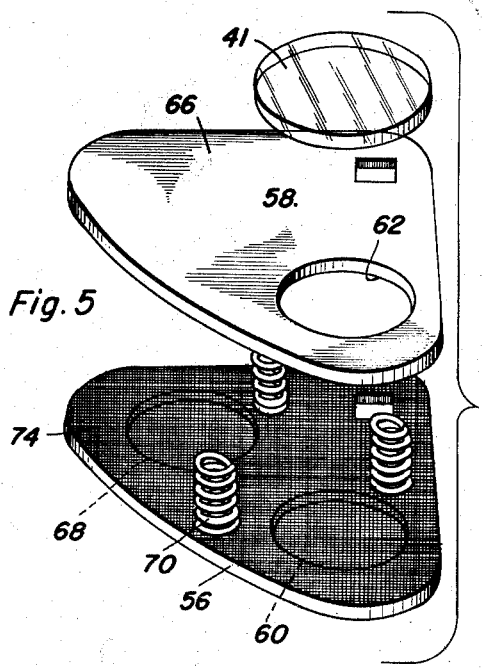
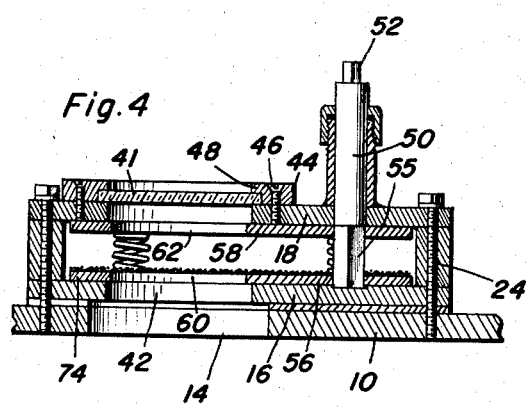

March 1, 1960    C. LIGON    2,926,658
SHUTTER TYPE FURNACE OBSERVATION PORT
Filed July 19, 1957    3 Sheets-Sheet 3

Cleon Ligon
INVENTOR.

United States Patent Office 2,926,658
Patented Mar. 1, 1960

2,926,658

SHUTTER TYPE FURNACE OBSERVATION PORT

Cleon Ligon, Amarillo, Tex.

Application July 19, 1957, Serial No. 673,068

9 Claims. (Cl. 126—200)

This invention relates to a furnace observation port and more particularly to a furnace observation port of the shutter type having means for air cooling of the lens thereof.

Modern steam generating furnaces operate under pressure above atmospheric pressure and require means for viewing the interior of the furnace while in operation. It is customary to utilize closed circuit television equipment to transmit an image of the furnace interior to a centralized control room or rooms for guidance of operators. The primary object of the present invention resides in the provision of an observation port with cooling provisions to limit the temperature of the port to a satisfactory value for use with the viewing equipment.

It is a further object of the present invention to provide means for removing the lens or sight glass from the observation point for cleaning or replacement without the necessity of shutting down the furnace.

Another object of the invention is to provide continued cooling of the housing of the observation port during the time the lens or sight glass is removed from the housing.

Still further objects and features of this invention reside in the provision of a furnace observation port that is simple in construction, convenient in use, and which is inexpensive to install, thereby permitting wide use and distribution in this particular field.

These, together with the various ancillary objects and features of the invention which will become apparent as the following description proceeds, are attained by this furnace observation port, a preferred embodiment of which has been illustrated in the accompanying drawings by way of example only, wherein:

Figure 3 is an elevational view of the furnace observation port with a portion thereof being broken away to show other parts of the device in section;

Figure 4 is a transverse sectional detail view as taken along the plane of line 4—4 in Figure 3;

Figure 5 is an exploded perspective view of the sight glass and shutter plates utilized in the present invention;

Figure 1:
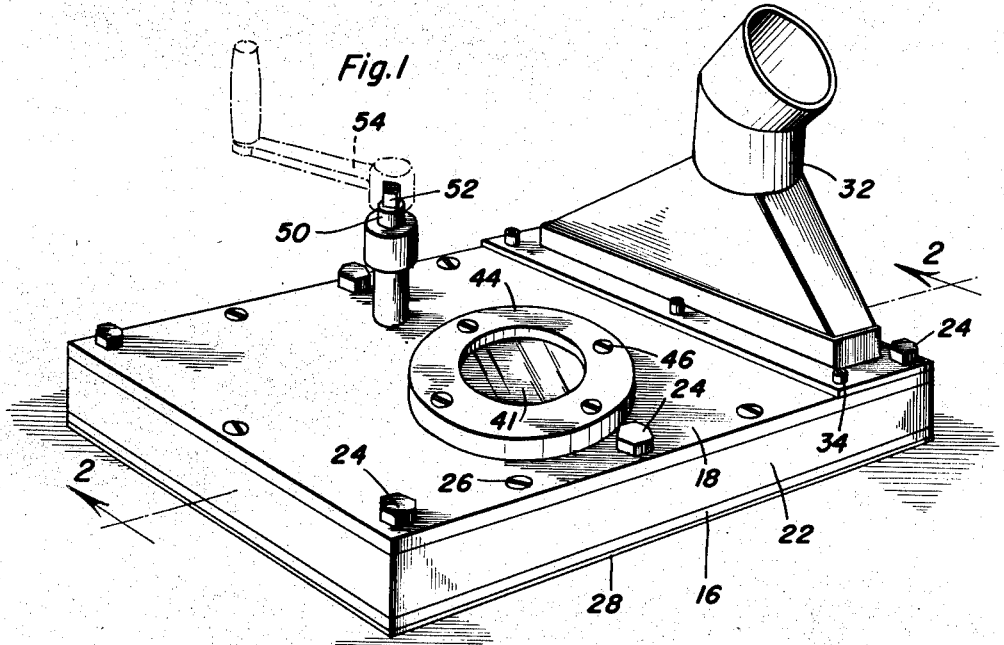
Figure 1 is a perspective view of the furnace observation port comprising the present invention.
Figure 2:
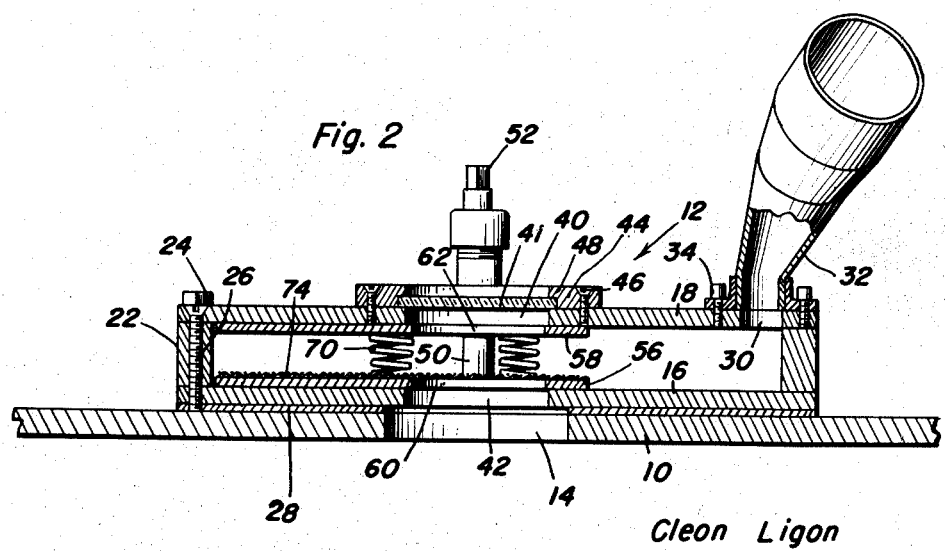
Figure 2 is a detail view as taken along the planes of line 2—2 in Figure 1.

With continuing reference to the accompanying drawings wherein like reference numerals designate similar parts throughout the various views, the reference numeral 10 generally designates a wall of the furnace utilizing the observation port generally indicated by reference numeral 12 comprising the present invention. The furnace 10 may have an opening 14 therein. The observation port 12 includes an inner cover 16 and an outer cover 18 having peripheral sides 22 extending therebetween, with the sides together with the covers forming a shallow rectangular box-like housing. By means of suitable bolts, as indicated at 24, the housing is secured to the furnace wall 10, it being noted that other fasteners such as screws 26 may be utilized to further secure the cover plate to the sides. A gasket of any suitable material such as sheet asbestos or the like may be provided as at 28 if considered necessary. The cover 18 is provided with an air inlet opening 30, and an air inlet fitting 32 is secured by means of suitable fasteners as at 34 to the cover 18 for connection to means supplying cooling air under pressure. The cover 18 has an opening 40 therethrough in alignment with the opening 42 in the cover 16 and also in alignment with the aperture 14 in the furnace 10. A sight glass 41 is held in place by a sight glass bracket 44 secured by means of screws 46 to the cover 18 with the sight glass bracket 44 being provided with a flange 48 overlying the sight glass 41. Hence, the sight glass 41 can be easily removed for replacement or cleaning as need be.

A shaft 50 is journaled in the cover plate 18 and is provided with a head 52 of any suitable shape such as the square shank shown so that a handle for rotating the shaft may be readily secured thereto as shown in phantom lines in Figure 1 and indicated by reference numeral 54. Mounted on the square portion 55 of the shaft for rotation therewith but slidable with respect to the shaft are the inner shutter plate 56 and the outer shutter plate 58, the shutter plates being provided with apertures 60 and 62, respectively, which apertures when aligned serve to permit ready observation of the interior of the furnace. However, the shutter plate 58 is provided with an imperforate portion such as indicated at 66, while the shutter plate 56 may be provided with a further opening 68 therein which will serve as an exhaust opening for the cooling air into the furnace. Alternatively, the opening 60 in the shutter plate 56 can be elongated, thus eliminating the opening 68. Springs of any suitable number as indicated at 70 are disposed between the shutter plates and serve to bias the shutter plates to yieldingly urge the shutter plates against the covers 16 and 18. Thus, the shutters are in a position so that the imperforate portion 66 of the shutter 58 overlies the opening 40 when in a closed position and provides an air seal for the opening 40.

A wire mesh screen 74 may be provided on the shutter plate 56 to provide improved distribution of the cooling air and to reduce the transmission of radiant heat to the lens or sight glass 41.

It is noted that a suitable packing gland may be provided for the shaft 50 as desired.

Figure 6:
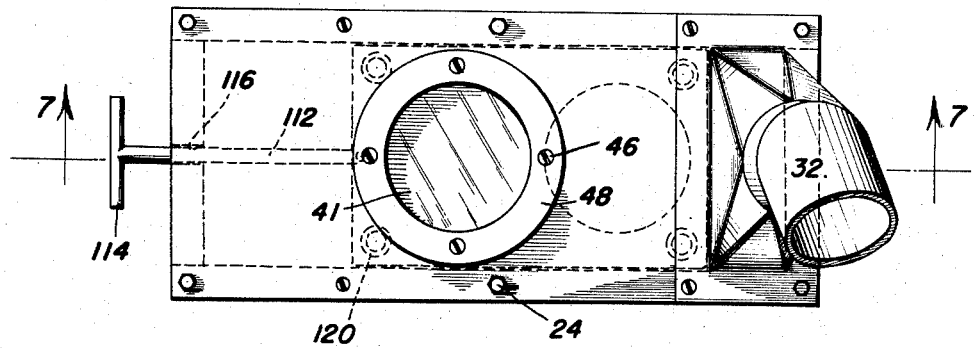
Figure 6 is a plan view of a modified form of the invention.
Figure 7:
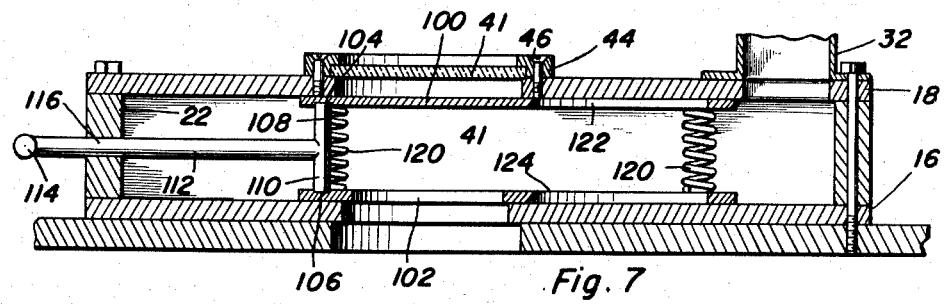
Figure 7 is a sectional detail view as taken along the plane of line 7—7 of Figure 6.

Referring now to the embodiment of the invention as is shown in Figures 6 and 7, it will be noted that herein the shutter plates 100 and 102 are of somewhat different construction than the shutter plates of the previously described forms of the invention even though the other portions thereof may be substantially identical. These shutter plates are provided with recesses as at 104 and 106 for reception of the portions 108 and 110 of a handle 112 having an actuating portion 114 outwardly of the housing, the handle extending through a bore 116 in the side wall 22 of the housing. In this form of the invention, while springs as at 120 are used to hold the shutter plates continuously apart, the shutter plates are positioned by means of actuation of the handle 112. The shutter plates are of course provided with suitable apertures as at 122 and 124 therein, it being noted that a screen may be provided covering the shutter plate 102 if such is desired.

Figure 8:
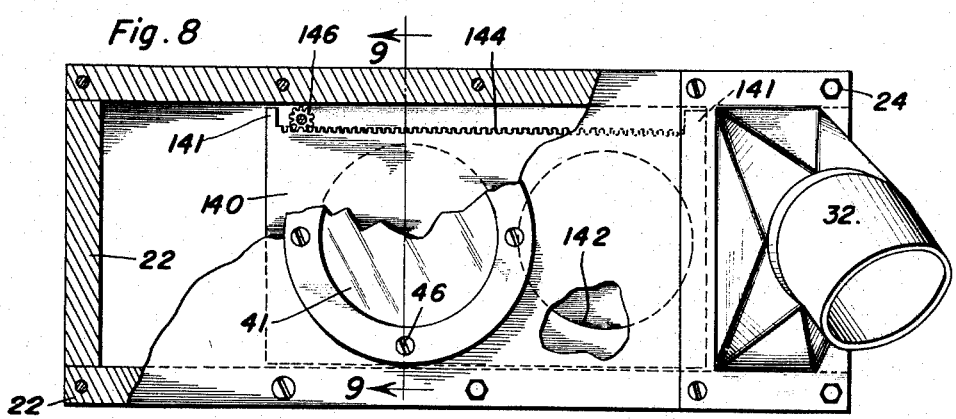
Figure 8 is a plan view of a further modified form of the invention employing only one shutter plate with a portion thereof being broken away to show other parts and details.

In Figure 8 there is shown a modified form of the invention employing only one shutter plate 140 having an opening 142 therethrough with the shutter plate being provided with a toothed rack-like surface 144 for engagement with a gear 146 actuated by a handle 148 secured thereto, which handle extends through a suitable gas tight bearing 150 in the top 18 and terminates in a portion 152 which may be readily rotated to move and position the shutter plate 140.

Figure 9:
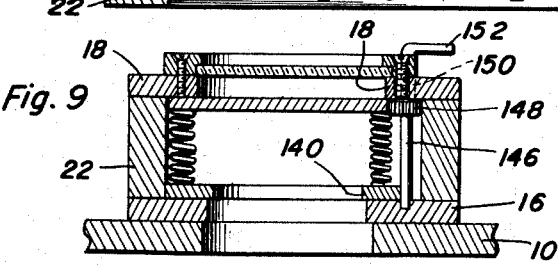
Figure 9 is a sectional detail view as taken along the plane of line 9—9 in Figure 8.

The shutter plate 140 may be provided with a screen if desired and may be of any suitable shape or size For the purpose of maintaining the sealed engagement of the shutter plate 140 against the undersurface of outer cover 18, the spring elements 160 are provided. To allow these springs 160 to move in unison with the shutter plate 140, a bearing plate 161 or suitable equivalent may be provided upon which the springs 160 seat. Any means may be provided for allowing the sliding movement of the springs 160 relative to the housing. However, in the specific embodiment shown, particularly as is illustrated in Figure 9, the plate 161 is provided and this plate is provided with an opening or elongate aperture 162 so that at no time does the opening into the furnace become interrupted. This permits the cooling air to be continually blown throughout the housing structure, there being a continuous flow through the inlet fitting 32 and through the opening 162 into the furnace.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A furnace observation port comprising a housing having an inner cover and an outer cover spaced from said inner cover, a conduit for supplying cooling air connected to said housing, said inner cover having an opening therethrough and said outer cover having an opening therethrough in alignment with said opening in said inner cover, a shaft journaled in said housing, an inner shutter plate and an outer shutter plate mounted on said shaft within said housing for pivotal movement, said shutter plates having apertures therethrough adapted to align with the openings in said inner cover and said outer cover, said outer shutter plate having an imperforate portion movable to close said opening in said outer cover, a plurality of springs disposed between said shutter plates resiliently engaging said shutter plates and urging said shutter plates against said inner cover and said outer cover.

2. A furnace observation port comprising a housing having an inner cover and an outer cover spaced from said inner cover, a conduit for supplying cooling air connected to said housing, said inner cover having an opening therethrough and said outer cover having an opening therethrough in alignment with said opening in said inner cover, a shaft journalled in said housing, an inner shutter plate and an outer shutter plate mounted on said shaft within said housing for pivotal movement, said shutter plates having apertures therethrough adapted to align with the openings in said inner cover and said outer cover, said outer shutter plate having an imperforate portion movable to close said opening in said outer cover, means for rotating said shaft to position said shutter plates, a sight glass positioned over said opening in said outer plate, and means detachably securing said sight glass to said outer cover, a plurality of springs disposed between said shutter plates resiliently engaging said shutter plates and urging said shutter plates against said inner cover and said outer cover.

3. A furnace observation port comprising a housing having an inner cover and an outer cover spaced from said inner cover, a conduit for supplying cooling air connected to said housing, said inner cover having an opening therethrough and said outer cover having an opening therethrough in alignment with said opening in said inner cover, a shaft journalled in said housing, an inner shutter plate and an outer shutter plate mounted on said shaft within said housing for pivotal movement, said shutter plates having apertures therethrough adapted to align with the openings in said inner cover and said outer cover, said outer shutter plate having an imperforate portion movable to close said opening in said outer cover, said inner shutter plate having a wire mesh screen secured to the outer surface thereof, and means for rotating said shaft to position said shutter plates, a sight glass positioned over said opening in said outer plate, and means detachably securing said sight glass to said outer cover, a plurality of springs disposed between said shutter plates resiliently engaging said shutter plates and urging said shutter plates against said inner cover and said outer cover.

4. A furnace observation assembly comprising a housing covering an opening in a furnace wall, said housing including spaced inner and outer cover members providing a chamber therebetween, said cover members having aligned openings therein in registry with the furnace wall opening, a sight glass covering the opening in said outer cover member and provided with retaining means removably secured to said outer cover member in sealing engagement therewith, a shutter plate sealingly engaging the inner face of said outer cover member, said shutter plate having an opening therein registrable with the opening in said outer cover member to permit observation through said sight glass into the furnace and having externally operable means connected thereto for selectively sliding the shutter plate so that its opening is moved into and out of registry with the opening in the outer cover member while maintaining, when the shutter plate covers the opening in the outer cover member, sealed engagement between the shutter plate and the outer cover member such that the sight glass may be removed and replaced without destroying the sealed, isolated condition of said chamber with respect to the ambient atmosphere.

5. A furnace observation assembly comprising a housing covering an opening in a furnace wall, said housing including spaced inner and outer cover members providing a chamber therebetween, said cover members having aligned openings therein in registry with the furnace wall opening, a sight glass covering the opening in said outer cover member and provided with retaining means removably secured to said outer cover member in sealing engagement therewith, a shutter plate sealingly engaging the inner face of said outer cover member, said shutter plate having an opening therein registrable with the opening in said outer cover member to permit observation through said sight glass into the furnace and having externally operable means connected thereto for selectively sliding the shutter plate so that its opening is moved into and out of registry with the opening in the outer cover member while maintaining, when the shutter plate covers the opening in the outer cover member, sealed engagement between the shutter plate and the outer cover member such that the sight glass may be removed and replaced without destroying the sealed, isolated condition of said chamber with respect to the ambient atmosphere, and means for introducing pressurized cooling air into said chamber.

6. The assembly as defined in and by claim 5 wherein the opening in said inner cover member is always free and unobstructed, and means for continuously introducing pressurized cooling air into said chamber and outwardly into the furnace through the opening in said inner cover member.

7. The combination of claim 1, including a sight glass positioned over said opening in said outer plate, and means detachably securing said sight glass to said outer cover.

8. The combination of claim 1, wherein said inner shutter plate has a wire mesh screen secured to the outer surface thereof, and means for rotating said shaft to position said shutter plates.

9. The combination of claim 1 wherein said sight glass has a wire screen of at least the same diameter as said sight glass mounted beneath and closely adjacent said sight glass, and means detachably securing said sight glass and said screen to said outer cover.

References Cited in the file of this patent

UNITED STATES PATENTS

| | | |
|---|---|---|
| 1,604,811 | Curry et al. | Oct. 26, 1926 |
| 1,938,022 | Amen | Dec. 5, 1933 |
| 1,999,782 | Rehm | Apr. 30, 1935 |
| 2,112,063 | Blizard | Mar. 22, 1938 |
| 2,197,637 | Goldberg | Apr. 16, 1940 |
| 2,434,924 | Hamilton | Jan. 27, 1948 |
| 2,440,938 | Falge | May 4, 1948 |